(12) United States Patent
Colasanto

(10) Patent No.: US 8,906,182 B1
(45) Date of Patent: Dec. 9, 2014

(54) CONTROLLED POROSITY, TRANSFER-COATED FABRICS

(75) Inventor: Thomas C. Colasanto, Tolland, CT (US)

(73) Assignee: Dartex Coatings, Inc., Slatersville, RI (US)

(*) Notice: Subject to any disclaimer, the term of this patent is extended or adjusted under 35 U.S.C. 154(b) by 823 days.

(21) Appl. No.: 13/156,302

(22) Filed: Jun. 8, 2011

Related U.S. Application Data

(60) Provisional application No. 61/352,641, filed on Jun. 8, 2010.

(51) Int. Cl.
| | |
|---|---|
| *B44C 1/17* | (2006.01) |
| *B29C 37/00* | (2006.01) |
| *B32B 37/26* | (2006.01) |
| *B32B 38/18* | (2006.01) |
| *B32B 43/00* | (2006.01) |

(52) U.S. Cl.
USPC ........... 156/231; 156/232; 156/235; 156/238; 156/247; 156/289; 156/719

(58) Field of Classification Search
USPC ......... 156/230–232, 235, 238, 247, 289, 701, 156/719
See application file for complete search history.

(56) References Cited

U.S. PATENT DOCUMENTS

| | | | | |
|---|---|---|---|---|
| 3,803,064 A | * | 4/1974 | Fishbein et al. | 521/107 |
| 3,836,423 A | * | 9/1974 | Wagner et al. | 428/316.6 |
| 4,003,777 A | * | 1/1977 | Eddy | 156/246 |
| 4,082,678 A | * | 4/1978 | Pracht et al. | 8/137 |
| 4,224,375 A | * | 9/1980 | Veiga et al. | 428/318.4 |
| 4,675,232 A | * | 6/1987 | Edenbaum et al. | 428/317.3 |
| 4,677,016 A | * | 6/1987 | Ferziger et al. | 428/212 |
| 4,789,413 A | | 12/1988 | Tani et al. | |
| 5,750,444 A | | 5/1998 | Jarrell et al. | |
| 5,888,650 A | * | 3/1999 | Calhoun et al. | 428/354 |
| 6,190,482 B1 | | 2/2001 | Colasanto | |
| 6,833,335 B2 | * | 12/2004 | DeMott et al. | 442/94 |
| 7,488,696 B2 | | 2/2009 | Rock et al. | |
| 7,645,815 B2 | * | 1/2010 | Hermes et al. | 523/172 |
| 2006/0252320 A1 | * | 11/2006 | Panse | 442/38 |

OTHER PUBLICATIONS

Polartec, "Polartec Power Shield", http://www.polartec.com/shelter/polartec-power-shield/how-does-it-work.aspx (accessed Jun. 9, 2011).

* cited by examiner

*Primary Examiner* — Sing P Chan
(74) *Attorney, Agent, or Firm* — Caesar, Rivise, Bernstein, Cohen & Pokotilow, Ltd.

(57) ABSTRACT

A method for preparing a composite fabric includes: casting a foamed liquid adhesive onto a smooth release-coated web; applying a fabric to the wet adhesive; fixing the adhesive to the fabric by drying; removing the release-coated web from the adhesive coated intermediate; depositing onto an embossed casting substrate a layer of liquid skin coat composition; applying the porous adhesive layer of the adhesive-coated intermediate to the wet skin layer; drying to fix the skin layer to the adhesive-coated intermediate; and separating the embossed casting substrate from the dried composite to provide the composite fabric. The resulting composite fabrics look and feel like soft shell composite fabrics.

8 Claims, 4 Drawing Sheets

CONTROLLED POROSITY, TRANSFER-COATED FABRICS

BACKGROUND OF THE INVENTION

1. Field of Invention

This invention relates to composite fabrics, and particularly to soft shell composites.

2. Description of Related Art

In the development of fabrics intended for use in the manufacture of outerwear, certain properties relating primarily to wearer comfort have become especially desirable. Among these are warmth, soft handle, elasticity, and breathability. These properties, in turn, must be balanced with the largely opposing properties of cost, durability, weatherproofness and surface appearance, all of which are critical to end user acceptance.

An important class of performance fabrics, commonly referred to as "soft shell" or alternatively "softshell", has emerged over the past couple of decades and represents the state-of-the-art among materials that attempt to balance these properties. These fabrics are typically multilayer laminates comprising an inner (next to skin) thermal knit fabric layer, an outer stretch woven fabric layer and optionally a functional barrier layer sandwiched between (see FIG. 5). The layers are typically bound together by a suitable adhesive system. These soft shell fabrics are well-recognized as having a familiar textile surface appearance and feel, while offering weather and abrasion resistance, and excellent wearer comfort. The latter being due to enhanced stretch and breathability characteristics relative to coated or laminated conventionally woven fabric counterparts, sometimes referred to as "hard shell" fabrics.

Within the soft shell fabric class itself one can find composites ranging in stretch from simply having noticeable "give", to those having pretty significant stretch and recovery in either one or all planar dimensions. The same goes for breathability and water resistance. Some soft shells offer waterproofness with a moderate degree of moisture vapor transmission (breathability), while others are engineered to provide a significant, yet controlled, degree of air permeability, and are thus capable of even higher rates of moisture vapor transmission. The latter, more often than not, are then restricted to being categorized as "water resistant" since they have sacrificed the property of hydrostatic resistance in favor of permeability. These materials however can still be very effective in keeping the wearer dry owing to the fact that their outer surface fabrics are treated with rather powerful laundry durable, water and stain repellent finishes. In summary, quality soft shell fabrics provide the wearer with a good level of weather protection, and very high comfort.

Soft shell fabrics are relatively expensive however. The addition of "give" or more importantly, significant omnidirectional stretch, require that these laminates employ fabrics that themselves stretch. Conventional knit fabrics, napped or otherwise meet this requirement in many cases, and in fact are commonly used as the inner fabric component. However, wovens are strongly preferred as outer (face) fabric components due to their widely accepted look and superior resistance to snagging and pilling. But since conventional woven fabrics inherently lack much stretch, special manufacturing techniques must be employed to purposely impart this property. For this reason stretch woven fabrics demand a noticeable premium in the marketplace. It is no wonder then that after considering the relatively high cost of at least one of the component fabrics, and also the fact that these fabrics need to be adeptly laminated using systems that maintain breathability, the finished composite fabric and resulting constructed garment can be quite expensive.

Accordingly, it is desired to provide a method and apparatus for the economical production of air permeable soft shell fabrics that mimic conventional stretch woven faced fabric laminates. It is further desired to provide a method and apparatus for imparting controllable porosity to a coated fabric while maintaining the stretch, durability and handle of traditional transfer-coated fabrics. It is still further desired to provide a method and apparatus to increase coated fabric durability while maintaining adequate softness of hand for fabrics of varying porosities.

BRIEF SUMMARY OF THE INVENTION

Accordingly, a first aspect of the invention comprises a method for preparing a composite fabric, said method comprising:

casting a foamed liquid adhesive onto a smooth release-coated web to provide a porous adhesive layer on the web;

applying a first surface of a fabric to the porous adhesive layer, while the porous adhesive layer is wet, so as to provide a first wet composite;

drying the first wet composite to fix the porous adhesive layer to the first surface of the fabric and thereby provide a first dry composite;

removing the release-coated web from the first dry composite to provide a porous adhesive coated intermediate;

depositing onto an embossed casting substrate a layer of liquid skin coat composition, so as to provide a wet skin layer;

applying the porous adhesive layer of the adhesive-coated intermediate to the wet skin layer, so as to provide a second wet composite;

drying the second wet composite to fix the skin layer to the adhesive-coated intermediate, and thereby provide a second dry composite; and separating the embossed casting substrate from the second dry composite to provide the composite fabric.

In certain embodiments, the foamed liquid adhesive comprises a polyurethane dispersion in water, sodium lauryl ether sulphate, ammonium stearate, polyfunctional aziridine and water-soluble PEG 90M.

In certain embodiments, the smooth release-coated web is a polyester film.

In certain embodiments, the first wet composite is dried at a temperature of 250-300° C. and then cooled, and the second wet composite is dried at a temperature of 250-300° C. and then cooled.

In certain embodiments, the embossed casting substrate is embossed polyurethane-grade casting paper.

In certain embodiments, the liquid skin coat composition comprises a polyurethane dispersion in water, a fluoroacrylate copolymer emulsion, a slip additive, fumed silica and a urethane rheology modifier.

In certain embodiments, the method further comprises providing an additional porous adhesive layer on the porous adhesive layer of the adhesive-coated intermediate prior to application of the wet skin layer.

In certain embodiments of the method, the composite fabric has an air permeability of 1 cfm/ft$^2$ according to ASTM D 737, a water repellency of 85 according to AATCC 22, a hydrostatic resistance of 35 mbar according to ASTM D 751, Procedure B, and an abrasion resistance greater than 2000 cycles according to ASTM D 3389.

A second aspect of the invention is a composite fabric produced by the method of the invention.

A third aspect of the invention is a composite fabric comprising:
an inner fabric layer;
an outer layer; and
a porous adhesive layer between the inner fabric layer and the outer layer,
wherein the outer layer is a textured-surface polymer film, and the composite fabric has an air permeability of at least 1 cfm/ft$^2$ according to ASTM D 737.

In certain embodiments, the composite fabric further comprises an additional porous adhesive layer between the porous adhesive layer and the outer layer In certain embodiments, the polymer film has a textured surface such that the composite fabric looks and feels like a soft shell composite fabric having a woven textile outer layer.

In certain embodiments, the porous adhesive layer(s) comprise(s) a preformed layer or a transfer coated layer.

In certain embodiments, the composite fabric has an air permeability of 1 cfm/ft$^2$ according to ASTM D 737, a water repellency of 85 according to AATCC 22, a hydrostatic resistance of 35 mbar according to ASTM D 751, Procedure B, and an abrasion resistance greater than 2000 cycles according to ASTM D 3389.

BRIEF DESCRIPTION OF SEVERAL VIEWS OF THE DRAWINGS

The invention will be described in conjunction with the following drawings, wherein.

DETAILED DESCRIPTION OF PREFERRED EMBODIMENTS OF THE INVENTION

Figure 1:
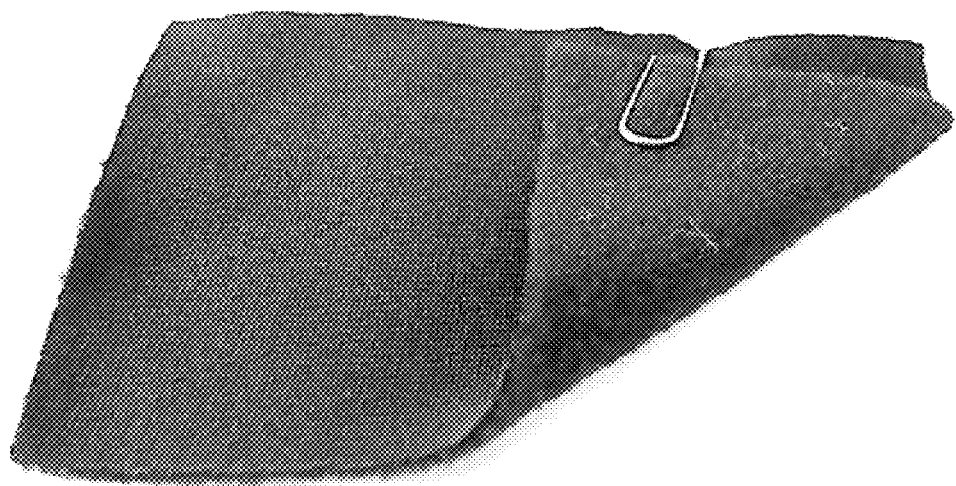
FIG. 1 is a photograph of an untreated knit substrate (fleece).

The invention enables the replacement of the costly outer layer of soft shells with a suitable elastomeric coating as the face surface. The elastomeric coating preferably mimics the appearance and handle of woven fabric, while still providing comparable resistance to wear and weather.

It was unexpected that a process other than weaving could yield a fabric having durability, permeability and softness of hand comparable to those of a woven soft shell fabric. Weaving a textile in a loom results in a loosely intertwined network that can easily maintain softness of hand in spite of the fact that relatively hard abrasion resistant polymers are used to form the filaments of its component yarns. Additionally, this loose construction inherently provides permeability. Thus, it was surprising that the continuous layer configuration of the non-woven layer of the invention could blend durability with permeability and softness of hand.

In addition, the invention overcame problems associated with providing an attractive non-woven face to soft shell composites. In order to impart a textile-like surface to an elastomeric coating, typically one skilled in the art would either employ a post-embossing process, if say the coating were directly applied to the inner fabric component, or alternatively, if a transfer coating process were considered, then a commercially available embossed casting paper could be selected to impart this texture.

A post-embossing process presents difficulties due first to the fact that direct-coating a dimensionally unstable (stretch) knit is not easily accomplished (moderate to high tension is normally applied to substrates coated in this manner), and second to the fact that the most likely suitable polymer candidate for the desired balance of properties is polyurethane, and polyurethane, especially the higher performing grades, requires rather high temperatures in order to "take" embossing.

Transfer coating also poses difficulties. In particular, there is no effective way of depositing what will ultimately be the outermost surface of the composite fabric, the coating, to a controllable porosity while maintaining its toughness and layer continuity. Indeed microporous polyurethane (PU) systems could be selected for this purpose, but they typically afford very low values of porosity (<1.0 cfm/ft$^2$) and preserving this porosity in an attempt to durably bond this deposited layer to a knit fabric substrate is exceedingly challenging. The same goes for foamed or expanded PU coating layers, which might offer higher porosities. They too would be challenging to deal with in the bonding process, besides the fact that they typically lack the toughness of compact PU layers.

Confronted with these challenges, the inventor experimented with various techniques focused on the goal of transfer coating a suitably compounded and pigmented polyurethane elastomeric polymer onto knit fabric substrates commonly employed in soft shell laminate constructions having the potential to maintain a reasonable degree of controllable porosity. In a typical transfer coating process, the outermost coating layer (skin coat) is deposited first, from solution or aqueous dispersion, directly onto a release-coated and optionally textured (e.g. embossed) web. After being subjecting to a drying and/or curing step, an adhesive layer is cast over this dried layer for the purpose of attaching a substrate (e.g. fabric). The substrate to be bonded may either be introduced to the adhesive layer before drying (wet lamination) or by employing heat and pressure after drying (dry lamination). In either case, once the bond is accomplished, the release-coated web is stripped away, yielding the transfer-coated fabric. The texture that the release-coated web had initially, is now imparted to the coated fabric surface, as its complement texture.

The invention will be illustrated in more detail with reference to the following Examples, but it should be understood that the present invention is not deemed to be limited thereto.

EXAMPLES

Example 1

Single-Coat Wet Lamination

Suitably compounded liquid skin coat compositions were deposited at various thicknesses onto embossed casting paper (release-coated web).

Common knit fabric was introduced to the PU layer while wet.

The composite structure was dried in an oven, removing volatile components, thus forming the coating layer.

After cooling, the casting paper was stripped free, generating the coated fabric.

Example 2

Foamed Skin/Foamed Adhesive Wet Lamination

Suitably compounded liquid skin coat compositions including foaming additives were mechanically foamed via the injection of air during agitation to various densities, then cast to various thicknesses onto embossed casting paper.

The wet-cast layer was dried in an oven resulting in an open-cell foamed skin layer.

Similarly foamed liquid adhesive was cast directly over the skin layer.

Common knit fabric was introduced to the adhesive layer while wet.

The composite structure was dried in an oven, forming the open-cell bonding layer and effectively tying the skin layer to the fabric.

After cooling, the casting paper was stripped free, generating the coated fabric.

Neither Example 1 nor Example 2 yielded composite fabrics completely balanced with respect to all desired properties.

Although the method of Example 1 showed promise in achieving potentially controllable air porosity due to the penetration of fabric fiber into and through the skin layer, the relatively hard polymer, necessary for wear properties, bound too tightly the fibers of the fabric, making the hand too firm along with either severely restricted elongation (stretch) or high susceptibility to fracture under elongating loads.

The method of Example 2 with its dual layer foam structure yielded coated fabric with a highly desirable hand, excellent texture and appearance, and good stretch properties without evidence of stress fracturing. By varying the density of the skin and/or adhesive layer, the control of air permeability to useful ranges was realized as well. This approach would represent an excellent solution if not for the fact that the foamed skin layer was inherently delicate towards surface abrasion and marring. In addition, the surface active additives necessary for attaining a quality, stable, liquid foam system would likely act counter to water and stain repellent additive systems that depend on their low surface energies for full effect. These systems would be necessary in any attempt to match the repellency levels of traditional woven-faced soft shell fabrics.

Example 3

Multiple Wet Transfer Coating Method of the Invention

The less than ideal results yielded by Examples 1 and 2 prompted the inventor to develop the inventive transfer-coating method, which is intended to address many of the difficulties seemingly inherent in a "coated" approach. What follows is an outline of the basic steps comprising a preferred embodiment of the inventive method, which can generally be described as the application of two successive wet transfer coatings to a substrate fabric: (1) a foamed adhesive or base layer, followed by (2) a compact "skin" or topcoat layer.

Step 1. A foamed liquid adhesive system is cast onto a smooth release-coated web to provide a uniform adhesive layer.

Step 2. Common knit fabric (see FIG. 1) is introduced to the adhesive layer, while wet.

Step 3. The composite of Step 2 is dried in an oven, thus fixing the adhesive layer to a first surface of the knit.

Figure 2:
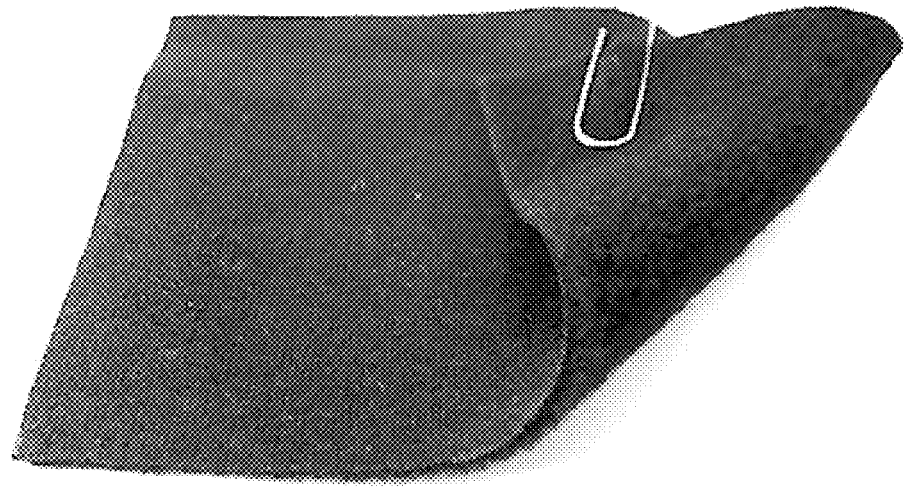
FIG. 2 is a photograph of the substrate of FIG. 1 treated with a polyurethane foam base layer.

Step 4. Once cooled, the resultant adhesive-coated knit intermediate (see FIG. 2) is stripped free from the release-coated web.

Figure 4:
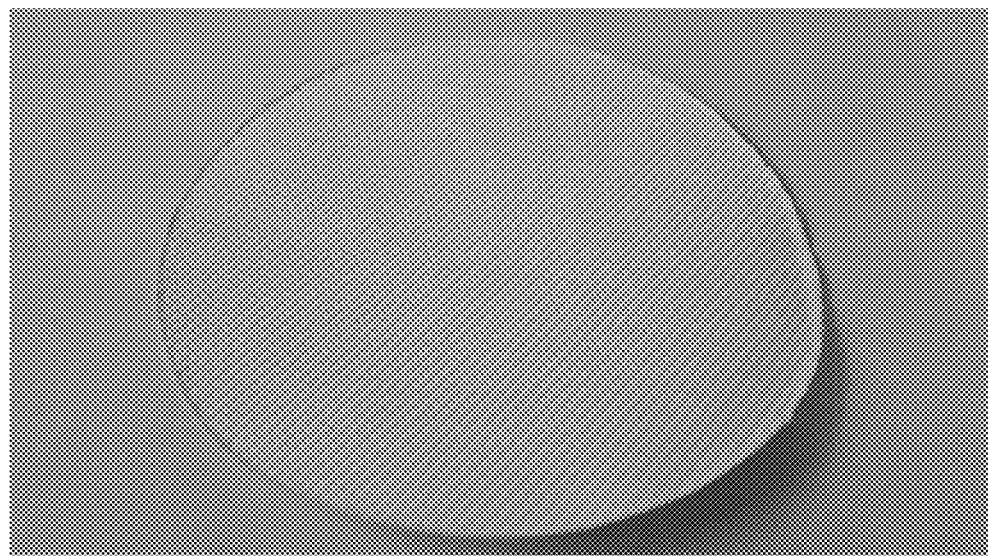
FIG. 4 is a photograph of embossed casting paper.
Figure 5:
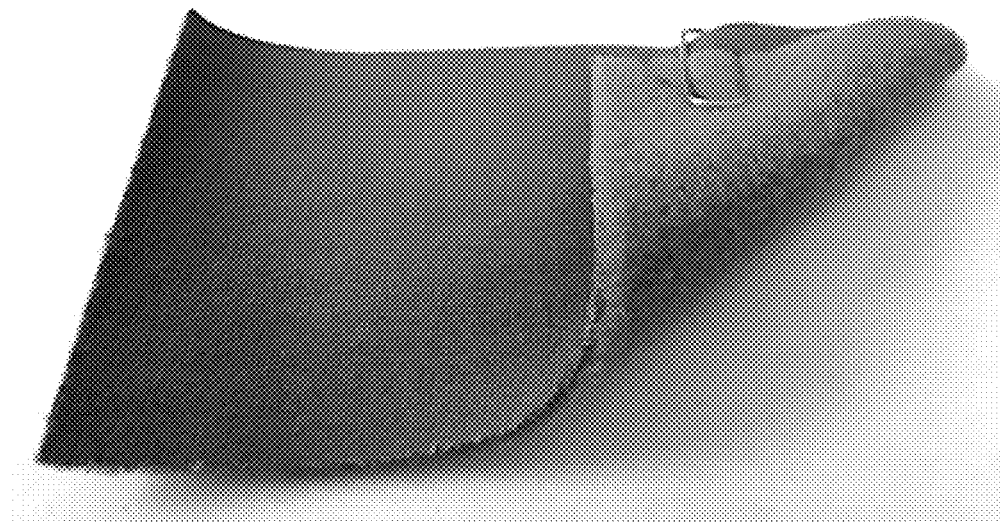
FIG. 5 is a photograph of a conventional stretch woven faced soft shell composite.

Step 5. A layer of suitably compounded liquid skin coat composition is deposited onto embossed casting paper (see release-coated web shown in FIG. 4).

Step 6. The adhesive layer of the adhesive-coated knit intermediate from Step 4 is introduced to the wet skin layer.

Step 7. The composite of Step 6 is dried in an oven, thus fixing the skin layer to the adhesive-coated knit intermediate.

Figure 3:
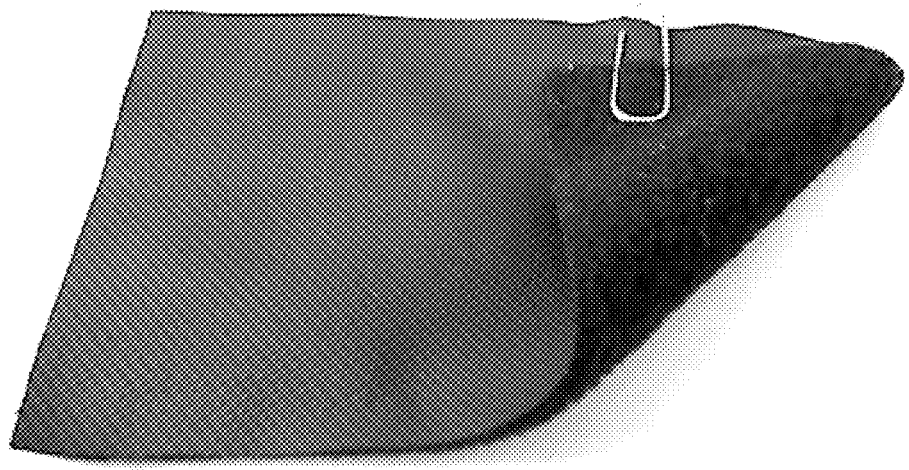
FIG. 3 is a photograph of an embodiment of a simulated woven face soft shell composite of the invention.

Step 8. Finally, once cooled, the finished composite fabric (see FIG. 3) is stripped free from the embossed paper.

Surprisingly, coated fabric produced by this method possesses the look, feel, and resistance properties of conventionally transfer-coated stretch fabrics, but with the important addition of porosity. Following some preliminary experimentation with the method, it was discovered that the following variables appear to have the most significant impact on final composite porosity: knit fabric (substrate) porosity; adhesive foam density and cell uniformity; casting paper texture; wet skin layer thickness and viscosity; and release coated web surface wettability towards foamed liquid adhesive. Furthermore, by carefully controlling these variables, one can easily and reliably control the resultant porosity within reasonably tight limits.

Although the underlying mechanism for the development of porosity in coated fabrics produced by this method is still under investigation, what follows is the current hypothesis (which in any event should not be considered a limitation on the scope of the invention).

1. Porosity of the untreated porous substrate is maintained to a controllable degree through the foam treatment step by virtue of the open cell structure of the dried foam layer.

Figure 6:
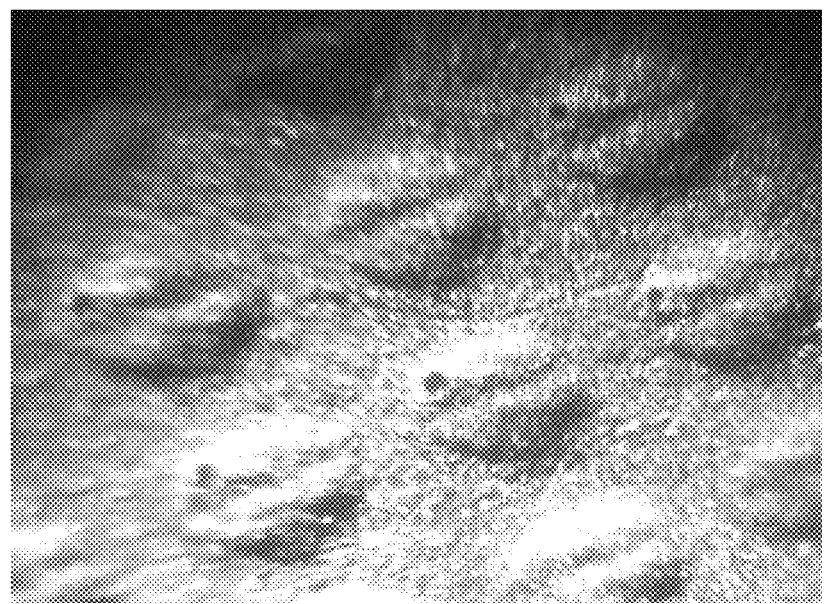
FIG. 6 is an optical photomicrograph of voids in a skin (outermost) layer of a soft shell composite of the invention.

2. The application of the liquid skin coat composition to textured (embossed) paper traps tiny bubbles of air that attempt to rise upward from their points of origin at each "valley" in the textured paper surface. But before they actually emerge and allow the coating to flow back into an impermeable layer, the foam treated porous substrate is closed to its wet surface. Upon drying it is believed that these trapped bubbles result in a pattern of voids within the plane of the skin layer that provide continuous channels at points where they coincide with open cells of the foam base layer. Examination of the coated side of composite fabric produced by this method via optical microscopy reveals "channels" located at peaks of the textured surface that continue through to the porous substrate (see FIG. 6).

Example 4

Preparation of a Foamed, Liquid Adhesive System

To 100 weight parts IMPRANIL DLU polyurethane dispersion, the following additives were charged individually under good agitation: Aqueous Black Color Concentrate, 11 parts; TEXAPON N-70 NA, 1.3 parts; Ammonium Stearate (30%), 2.5 parts; Pre-Blend of XAIVIA-7, 3 parts; and POLYOX WSR-301, 0.6 parts. See Table 1 below for additional information regarding the raw materials used in Examples 4-6.

TABLE 1

Raw Materials

| Material | Product Code | Supplier | Notes |
|---|---|---|---|
| IMPRANIL DLU | IMPRANIL DLU | Bayer MaterialScience | anionic aliphatic polyether/polycarbonate polyurethane dispersion in water |
| IMPRANIL DLC-F | IMPRANIL DLC-F | Bayer MaterialScience | anionic polycarbonate ester polyurethane dispersion in water. |
| Aqueous Black Color Concentrate | N/A | N/A | Preparation of Water, Isopropanol, MICROLITH C-WA, And Triethylamine (58:10:30:2) |
| MICROLITH C-WA | MICROLITH C-WA | BASF | Carbon black pigment |
| TEXAPON N-70 NA | TEXAPON N-70 NA | Cognis Corporation | Sodium lauryl ether sulphate |
| Ammonium Stearate (30%) | Ammonium Stearate (30%) | Geo Specialty Chemicals | |
| XAMA-7 | XAMA-7 | Bayer MaterialScience | polyfunctional aziridine which is utilized as a crosslinking agent and adhesion promoter and modifier |
| POLYOX WSR-301 | POLYOX WSR-301 | Dow Chemical | Water-soluble PEG-90M |
| REPEARL F-7005 | REPEARL F-7005 | Mitsubishi Chemical | fluoroacrylate copolymer emulsion |
| GLIDE 482 | GLIDE 482 | Tego Coating and Ink Additives | Slip and antiblocking additive |
| AEROSIL R 972 | AEROSIL R 972 | Evonik Industries | Fumed silica |
| ACRYSOL RM-8W | ACRYSOL RM-8W | Rohm & Haas | Non-ionic, solvent-free urethane rheology modifier |
| 2 mil Release Coated Polyester Liner | 2 mil PET C/1/S Easy Release | MPI Technologies | |
| Stretch Fleece Fabric | Style 9021 | Polartec LLC | |
| Embossed PU-Grade Casting Paper | Style BSC100 Roxane | Favini | |

Upon complete dissolution of the POLYOX resin particles (20-60 minutes), the viscous compound was charged to a KITCHEN-AID mixer equipped with a wire whisk, then processed at moderate speed until a liquid foam of about 250 g/l density was obtained.

Example 5

Preparation of a Liquid Skin Coat Composition

To 100 weight parts IMPRANIL DLU/IMPRANIL DLC-F blend (40:60), the following additives were charged individually under good agitation to obtain a liquid skin coat composition: Aqueous Black Color Concentrate (see raw material table), 11 parts; REPEARL F-7005, 8.3 parts; GLIDE 482, 2.5 parts; AEROSIL R 972, 2.5 parts; Water, 18.6 parts; and ACRYSOL RM-8W, 2.9 parts.

Example 6

Production of a PU Foam Coated Stretch Fleece Intermediate

Onto a sheet of 2 mil release-coated polyester liner was cast an approximately 8 mil thick layer of the foamed liquid adhesive of Example 4. A swatch of one-side-napped, stretch fleece fabric was carefully closed on its unnapped surface to the exposed wet foam layer using light roller pressure to ensure complete contact, then placed in a circulating air oven at 275° F. for 2 minutes. Upon cooling, the release liner was removed from the foam-coated fleece and discarded.

Onto a second sheet of release liner was cast an approximately 8 mil thick layer of the foamed liquid adhesive of Example 4, into which the previously coated side of the foam-coated fleece was carefully closed, again using light roller pressure to ensure complete contact, then placed in a circulating air oven at 275° F. for 2 minutes. Upon cooling, the release liner was removed and discarded. The double-foam coated fleece swatch was carefully weighed to determine foam layer add-on, and then evaluated for air permeability. Dried foam add-on: 1.5 oz/yd². Intermediate composite fabric air permeability: Approximately 30 cfm/ft².

Example 7

Preparation of a Composite Fabric

Onto a sheet of embossed PU-grade casting paper was cast an approximately 5 mil thick layer of the liquid skin coat composition of Example 5. The exposed foam surface of the foam coated fleece intermediate was carefully closed to the wet skin layer using light roller pressure to ensure complete contact, then placed in a circulating air oven at 275° F. for 2 minutes. Upon cooling, the casting paper was removed from the composite fabric and discarded.

The composite fabric was finally subjected to a one minute, 300° F. post-cure, then evaluated for skin layer add-on, air permeability, water repellency, hand, appearance, stretch, abrasion and hydrostatic resistance, as shown in Table 2 below.

TABLE 2

Results of Composite Fabric Testing

| Property | Testing Method | Result |
| --- | --- | --- |
| Skin Layer Add-on | Measuring difference between before and after weights of fabric | 1.8 oz/yd$^2$ |
| Air Permeability | ASTM D 737 | ~1 cfm |
| Water Repellency | AATCC 22 | 85 rating |
| Hydrostatic Resistance | ASTM D 751, Procedure B | 35 mbar |
| Abrasion Resistance | ASTM D 3389 | >2000 cycles to visible wear (CS-17/1000 g) |
| Hand | Manual Inspection | Soft, supple, with a fabric-like feel, comparable to conventional soft shell stretch woven/fleece laminates |
| Appearance | Visual Inspection | Woven textile-like |
| Stretch | Manual Manipulation | Excellent omnidirectional stretch, comparable to fleece starting material. Excellent recovery. |

Figure 7:
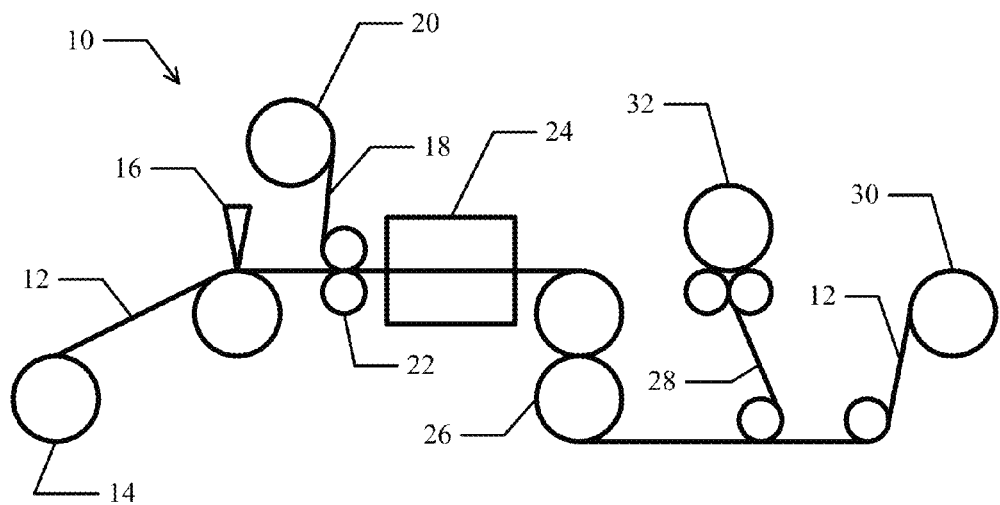
FIG. 7 is a schematic view of an embodiment of a processing line for producing a polyurethane foam coated stretch fleece intermediate of the invention.
Figure 8:
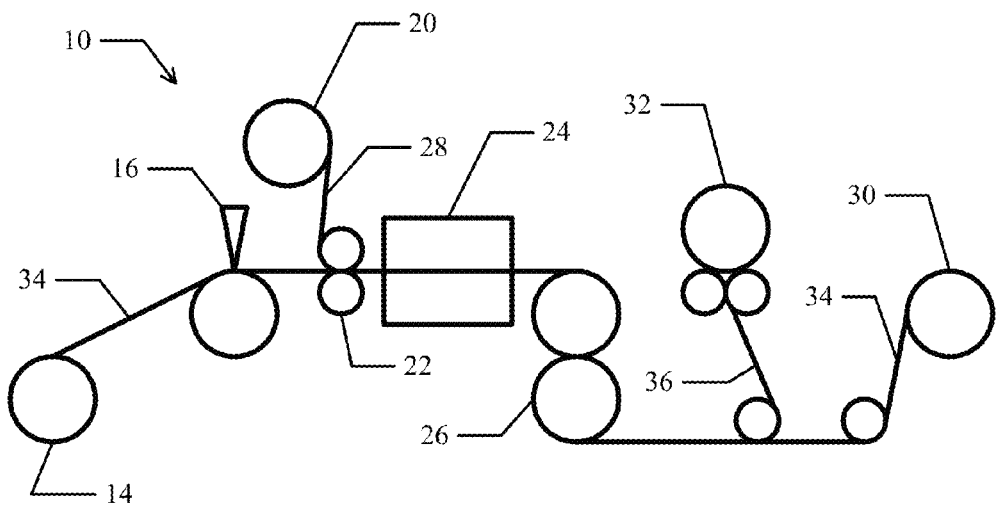
FIG. 8 is a schematic view of an embodiment of a processing line for producing an embodiment of the inventive composite fabric.

FIGS. 7 and 8 illustrate apparatus suitable for preparing the composite fabric of the invention.

Referring to FIG. 7, apparatus 10 is arranged to produce a polyurethane foam coated stretch fleece intermediate of the invention, such as that produced in Example 6. Thus, release coated liner 12 is fed from roller 14 and coated with foamed liquid adhesive at knife over roller station 16. Stretch fleece fabric 18 is fed from roller 20 such that its unnapped surface contacts the foamed liquid adhesive on the adhesive coated liner as the adhesive coated liner and stretch fleece fabric 18 pass through paired rollers 22. The resulting laminate continues through oven 24 and paired rollers 26. Release liner 12 is separated from foam-coated fleece fabric 28, with the release liner being taken up by roller 30 and fabric 28 being collected by roller 32. Fabric 28 is subsequently passed through apparatus 10 a second time so as to provide an additional foamed liquid adhesive coating to the foam-coated fleece fabric 28.

The release liner 12 can be any dimensionally stable, coatable web with adequate release properties towards the dried foam layer. The liner's surface energy or ability to be wet by the liquid foam layer impacts foam layer porosity.

The fabric can be any porous flexible substrate, natural or synthetic, woven or non-woven, including fleece and leather.

The foamed liquid adhesive preferably comprises any suitably compounded elastomeric compositions of polyurethane, acrylic, natural and synthetic polymers resulting in open cell foam structures. The wet foam density is preferably 200-450 g/l, and more preferably about 250 g/l. However, this variable is anticipated to be highly system dependent and can be adjusted as desired.

The foam layer has a porosity and thickness dependent upon desired composite fabric properties. Thicker, and/or multiple foam layers are required for higher stretch composites. Alternatively, the foam layer may be pre-formed and suitably bonded to the substrate fabric. Alternatively, the foam layer may be omitted entirely for low or no stretch laminates. In other words, in certain embodiments, the skin layer may be applied directly to a suitable porous substrate.

Referring to FIG. 8, apparatus 10 is arranged to produce a composite fabric of the invention, such as that produced in Example 7. Thus, embossed polyurethane-grade casting paper 34 is fed from roller 14 and coated with a liquid skin coat composition (such as described in Example 5) at knife over roller station 16. Foam coated fleece intermediate 28 is fed from roller 20 such that its exposed adhesive surface contacts the wet skin layer as the coated casting paper 34 and intermediate 28 pass through paired rollers 22. The resulting laminate continues through oven 24 and paired rollers 26. Casting paper 34 is separated from composite fabric 36, with the casting paper being taken up by roller 30 and composite fabric 36 being collected by roller 32. Composite fabric 36 is preferably subjected to a subsequent heat treatment for further curing.

The embossed casting paper 34 can comprise any of a wide range of commercially available or custom designed embossed substrates with desired release properties. The texture of embossing impacts final porosity and coating surface appearance.

The liquid skin composition preferably comprises any castable, suitably compounded elastomeric composition of polyurethane, acrylic, natural and synthetic polymers. The preferred viscosity is 12,000 to 17,000 cps at 10 rpm.

The skin layer is preferably applied to a weight from 0.25 to 2.0 oz/yd$^2$ (dry), more preferably from 0.75 to 2.0 oz/yd$^2$ (dry). This variable directly impacts wear properties, stiffness of hand, stretch, and final composite porosity (with higher wet layer thickness tending to increase porosity).

The skin and the foam can be coated on the fabric by any suitable method resulting in a uniform continuous layer including knife-over-roll, reverse-roll, and Mayer rod methods.

Suitable drying temperatures vary depending on the chemistry of the liquid skin and foam systems.

In certain embodiments, a durable water-repellant system is provided by adding directly to the liquid skin system fluorochemical additives known to enhance water repellency. Alternatively (or additionally), such additives can be post-applied to the composite fabric by conventional techniques, such as, e.g., padding and drying.

While the invention has been described in detail and with reference to specific examples thereof, it will be apparent to one skilled in the art that various changes and modifications can be made therein without departing from the spirit and scope thereof.

What is claimed is:

1. A method for preparing a composite fabric, said method comprising:
   casting a foamed liquid adhesive onto a smooth release-coated web to provide a porous adhesive layer on the web;
   applying a first surface of a fabric to the porous adhesive layer, while the porous adhesive layer is wet, so as to provide a first wet composite;
   drying the first wet composite to fix the porous adhesive layer to the first surface of the fabric and thereby provide a first dry composite;
   removing the release-coated web from the first dry composite to provide a porous adhesive-coated intermediate;
   depositing onto an embossed casting substrate a layer of liquid skin coat composition, so as to provide a wet skin layer;
   applying the porous adhesive layer of the adhesive-coated intermediate to the wet skin layer, so as to provide a second wet composite;

drying the second wet composite to fix the skin layer to the adhesive-coated intermediate, and thereby provide a second dry composite; and separating the embossed casting substrate from the second dry composite to provide the composite fabric.

2. The method of claim 1, wherein the foamed liquid adhesive comprises a polyurethane dispersion in water, sodium lauryl ether sulphate, ammonium stearate, polyfunctional aziridine and water-soluble polyethylene glycol.

3. The method of claim 1, wherein the smooth release-coated web is a polyester film.

4. The method of claim 1, wherein the first wet composite is dried at a temperature of 250-300° F. and then cooled, and the second wet composite is dried at a temperature of 250-300° F. and then cooled.

5. The method of claim 1, wherein the embossed casting substrate is embossed polyurethane-grade casting paper.

6. The method of claim 1, wherein the liquid skin coat composition comprises a polyurethane dispersion in water, a fluoroacrylate copolymer emulsion, a slip additive, fumed silica and a urethane rheology modifier.

7. The method of claim 1, further comprising providing an additional porous adhesive layer on the porous adhesive layer prior to applying the adhesive-coated intermediate to the wet skin layer.

8. The method of claim 1, wherein the composite fabric has an air permeability of 1 cfm/ft$^2$ according to ASTM D 737, a water repellency of 85 according to AATCC 22, a hydrostatic resistance of 35 mbar according to ASTM D 751, Procedure B, and an abrasion resistance greater than 2000 cycles according to ASTM D 3389.

\* \* \* \* \*